(12) United States Patent
Van Horck

(10) Patent No.: US 7,712,115 B2
(45) Date of Patent: May 4, 2010

(54) HANDLING OF PROGRAM RATINGS FOR DIGITAL TELEVISION

(75) Inventor: Hendrikus G. Van Horck, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 1122 days.

(21) Appl. No.: 10/567,393

(22) PCT Filed: Aug. 4, 2004

(86) PCT No.: PCT/IB2004/051393

§ 371 (c)(1), (2), (4) Date: Feb. 7, 2006

(87) PCT Pub. No.: WO2005/015914

PCT Pub. Date: Feb. 17, 2005

(65) Prior Publication Data

US 2006/0218574 A1    Sep. 28, 2006

Related U.S. Application Data

(60) Provisional application No. 60/493,272, filed on Aug. 7, 2003, provisional application No. 60/529,584, filed on Dec. 15, 2003.

(51) Int. Cl.
*H04N 7/16* (2006.01)
(52) U.S. Cl. .............................. 725/28; 725/27; 725/29; 725/30; 725/31; 725/25; 725/44; 725/45; 725/46; 386/94
(58) Field of Classification Search ............. 725/25–31, 725/44–46; 386/94
See application file for complete search history.

(56) References Cited

U.S. PATENT DOCUMENTS

| 5,828,402 | A | * | 10/1998 | Collings | ................. 725/28 |
| 5,973,683 | A | * | 10/1999 | Cragun et al. | ............. 715/719 |
| 6,216,263 | B1 | * | 4/2001 | Elam | ...................... 725/28 |
| 6,449,766 | B1 | * | 9/2002 | Fleming | ................. 725/28 |
| 6,567,979 | B1 | * | 5/2003 | deCarmo | ................. 725/25 |
| 6,643,715 | B1 | * | 11/2003 | Arthur | ................... 710/14 |
| 6,760,915 | B2 | * | 7/2004 | deCarmo | ................. 725/28 |
| 7,073,193 | B2 | * | 7/2006 | Marsh | ................... 725/114 |

(Continued)

FOREIGN PATENT DOCUMENTS

| EP | 0810603 A1 | 12/1997 |
| EP | 0940043 B1 | 9/1999 |

(Continued)

OTHER PUBLICATIONS

Digital Video Broadcasting (DVB); ETSI TR 101 211 V1.7.1, vol. BC, No. V151, ETSI Standard, XP-014004804.

Primary Examiner—Jason P Salce

(57) ABSTRACT

When a digital data transmission such as a digital television transmission is received by a receiver (100), the receiver attempts to locate parental rating data for a program in the transmission for a home country or jurisdiction (105, 220) in which the receiver is located. If the home jurisdiction rating data is available, it is used to control blocking of the program (270). If the home jurisdiction rating data is not available, rating data is obtained from the transmission for a foreign jurisdiction to control blocking of the program (270). If ratings for multiple foreign jurisdictions are available, the highest, most strict rating (240), may be used to control blocking of the program.

20 Claims, 2 Drawing Sheets

U.S. PATENT DOCUMENTS

Figure 1:
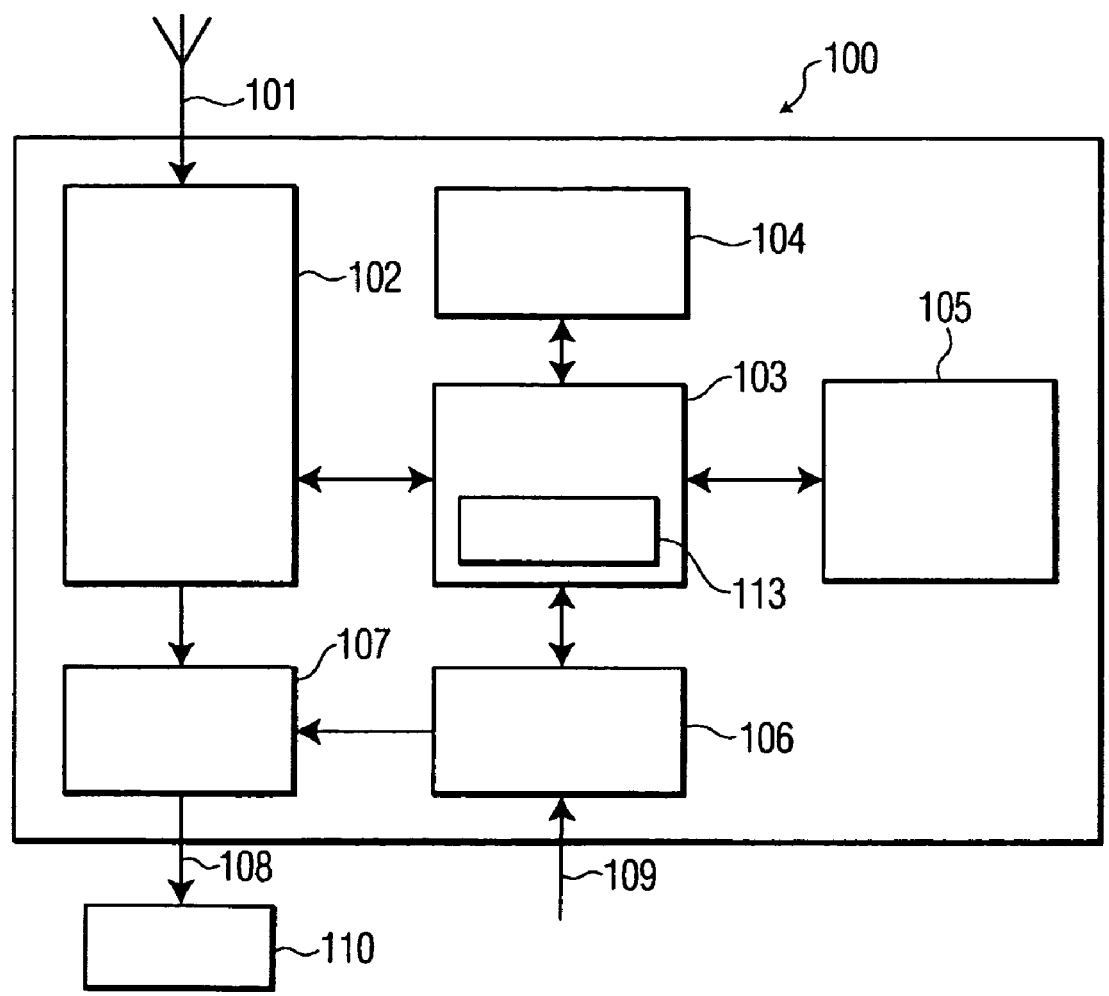

| | | | |
|---|---|---|---|
| 7,380,258 B2 * | 5/2008 | Durden et al. | 725/25 |
| 2001/0016948 A1 | 8/2001 | Longhorn et al. | |
| 2003/0037329 A1 * | 2/2003 | Piotrowski et al. | 725/28 |
| 2003/0051238 A1 * | 3/2003 | Barone, Jr. | 725/32 |

FOREIGN PATENT DOCUMENTS

| | | |
|---|---|---|
| WO | WO0027114 | 5/2000 |
| WO | WO0141439 A1 | 6/2001 |

* cited by examiner

HANDLING OF PROGRAM RATINGS FOR DIGITAL TELEVISION

CROSS REFERENCE TO RELATED APPLICATION

This application claims the benefit of U.S. provisional application Ser. Nos. 60/493,272 and 60/529,584 filed Aug. 7, 2003 and Dec. 15, 2003, which is incorporated herein in whole by reference.

The invention relates generally to digital television communications and, more particularly, to a technique for handling program ratings.

Digital television communications have become increasingly popular due to the quality of the audio and video signals and the various features that can be realized. For example, standards defined by the Digital Video Broadcasting (DVB) consortium have been implemented in many parts of the world. Among other things, these standards include a series of transmission specifications, including DVB-S, a satellite transmission standard, DVB-C, a cable delivery standard, and DVB-T, a terrestrial transmission standard. DVB-T is a sophisticated and flexible digital terrestrial transmission system that is based on COFDM (Coded Orthogonal Frequency Divisional Multiplexing) and QPSK, 16 QAM and 64 QAM modulation. DVB-T allows services providers to match, and even improve on, analogue coverage, at a fraction of the power. Moreover, it extends the scope of digital terrestrial television in the mobile field, such as to portable hand-held devices.

Rating systems have developed to inform the user of whether a given program may contain objectionable subject matter. The user can use the ratings in determining whether the program is appropriate for themselves or their children. Moreover, a blocking system may be used, based on the ratings, to prevent children from viewing unsuitable programs. For example, the blocking system may require the user to enter a password to view particular programs. The program rating data or event data, also referred to as parental rating data, is typically set by the broadcaster and included in the transmission of the program. The receiver, such as a set-top box in the user's home, can recover the rating data and determine whether to block a program by comparing the rating to a user-defined system rating.

However, different rating systems are used for different countries. For example, some counties use extra ratings that are not recognized by other countries. Moreover, sometimes a rating is not specified.

The present invention addresses the above and other issues.

The invention provides a receiver that implements a rating, such as a parental rating, for a program in a digital data transmission, regardless of the country in which the receiver is located or the country from which the transmission was made.

In a particular aspect of the invention, a method for obtaining rating data includes receiving a digital data transmission carrying at least one program, identifying a home jurisdiction of a receiver that receives the digital data transmission, determining whether rating data is provided in the digital data transmission for the at least one program for the home jurisdiction, using the rating data for the at least one program for the home jurisdiction, if available, to determine whether to block display of the at least one program; and if the rating data for the at least one program for the home jurisdiction is not available, using rating data that is provided in the digital data transmission for the at least one program for a foreign jurisdiction to determine whether to block display of the at least one program.

A related receiver apparatus and program storage device are also provided.

Figure 2:
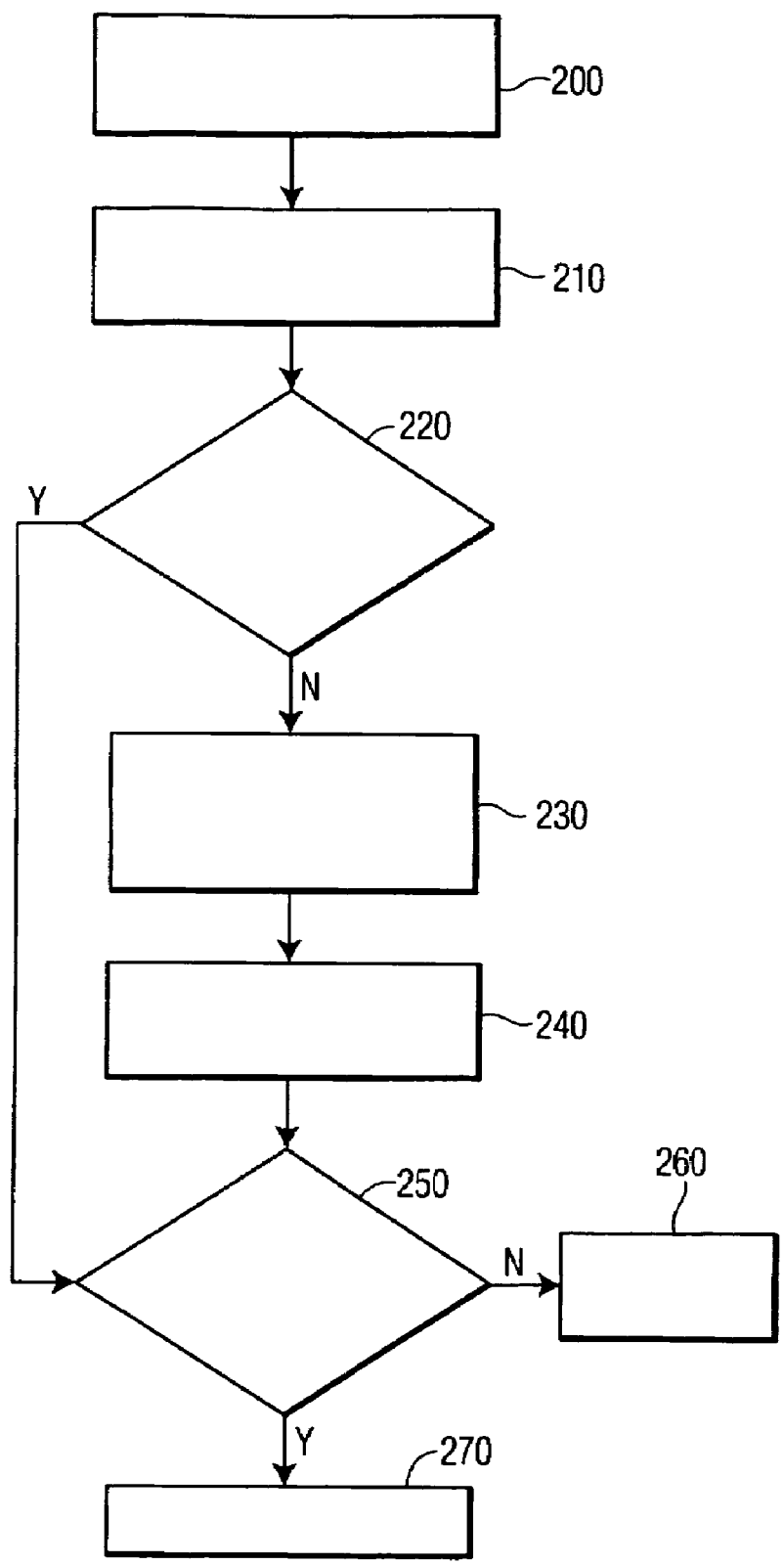

In the drawings:

FIG. 1 illustrates an example receiver for handling program ratings according to the invention; and FIG. 2 illustrates a method for handling program ratings according to the invention.

In all the Figures, corresponding parts are referenced by the same reference numerals.

FIG. 1 illustrates an example receiver for handling ratings according to the invention. Block 102 is a "tuner and decoder." Block 103 is "control circuitry." Block 113 is a "memory". Block 104 is a "rating data" memory. Block 105 is a "country/region setting" memory. Block 107 is "output circuitry". Block 106 is a "user interface." Block 110 is a "display".

The receiver 100 may be essentially any suitable data receiver, including Digital Home Equipment, e.g., a digital TV, an interactive digital TV (iDTV) set-top box (STB), personal video recorder (PVR), Digital Audio, or DVD. The receiver may further include a mobile receiver such as a PDA or mobile phone. In one possible approach, the invention is implemented using components within a television set-top box receiver, e.g., receiver 100 that receives a television signal via an input path 101, such as an antenna, and outputs a signal for display on a display device 110 such as a television via signal output path 108. However, the invention is generally applicable to any type of device that receives video and/or audio programs. For example, the invention may be implemented in a computer that receives video programs from a network such as the Internet, e.g., by downloading, streaming or broadcasting, such as webcasting. The video programs typically include an audio track although this is not required. Moreover, the invention can be used with audio-only programs such as those provided via the Internet, e.g., as webcasts, or via radio broadcasts, including terrestrial and satellite radio broadcasts.

The receiver 100 tunes, demultiplexes and decodes the received programs at a tuner/decoder 102. Rating data carried in the received transmission is also tuned, decoded and recovered by the tuner//decoder 102 and provided to control circuitry 103. The programs may be provided in a digital or analog multiplex that is transmitted by cable, satellite, or terrestrial broadcast, for example. Generally, one of the programs is decoded based on a channel selection made by the user/viewer via a handheld remote control. A user input signal from the remote control is processed by a user interface function 106 in the receiver 100. The remote control may use any type of communication path 109, such as infrared, wired, ultrasound, radio frequency, etc. When the user selects a channel via the user interface 106, the control circuitry 103 recovers the corresponding program, e.g., using information such as packet identifiers (PIDs), from the received transmission. The control circuitry 103 can block the selected program from being displayed if the rating data does not meet a user-set system rating.

The decoded program may be communicated to the display device 110 via output circuitry 107 or stored locally for subsequent display. The control circuitry 103, such as a microprocessor with a working memory 113, may interact with the tuner/decoder 102 to control the functions of the tuner/decoder 102. The working memory 113 may be considered a program storage device that stores software that is executed by the control circuitry 103 to achieve the functionality described herein. However, resources for storing and processing instructions such as software to achieve the desired functionality may be provided using any known techniques.

The control circuitry 103 stores the rating data in a rating data memory 104. A user-set system rating can be stored in the memory 104 as well, or at any desired location. A country and region setting may be stored in a memory 105 for use by the control circuitry 103 in its decision-making processes. The memories 104 and 105 are shown as being separate but may be combined with other memory resources.

The rating data in the received transmission may include a country code and rating for each program for a number of jurisdictions. For example, a jurisdiction may be a country or region, e.g., a portion of a country or a group of multiple countries. In one possible example, the rating data is provided according to the parental rating descriptor of Table 2, discussed further below. In accordance with the invention, when a rating for the home jurisdiction is available in the received digital data transmission for a program, this rating is used to determine whether to block display of the program. If the rating data for the home jurisdiction is not available, rating data from one or more foreign jurisdictions is used, as available. When ratings for multiple foreign jurisdictions are available for the program, the highest, most strict rating may be used to determine whether to block display of the program.

The home jurisdiction is typically set by the user, such as via the user interface 106, to identify the country or other jurisdiction in which the receiver is located. A hardware setting such as a switch that is configured at the time of manufacture or installation may also be used. Information that identifies the country that is associated with a rating may be detected from the data, e.g., using the term ON Id, which is the Original Network Id, e.g., original_network_id, or country_code.

FIG. 2 illustrates a method for handling program ratings according to the invention. Block 200 states "receive digital data transmission". Block 210 states "identify home jurisdiction". Block 220 asks "rating data available for home jurisdiction?" Block 230 states "obtain rating data for foreign jurisdiction(s)". Block 240 states "select highest rating, if applicable". Block 250 asks "system rating exceeds program rating?" Block 260 states "display program". Block 270 states "block program."

As indicated at block 200, a digital data transmission is received by the receiver 100. The user may select a desired program, such as by using an on-screen program guide provided by the user interface function 106, or by directly selecting a channel. At block 210, the home jurisdiction of the receiver is identified, such as by using the data in the country/region setting memory 105. At block 220, it is determined whether rating data for a program for the home jurisdiction is available. Note that a blocking determination may be made for a particular program that the user is requesting to view, such as by selecting the channel number in which the program is carried via the user interface function 106. Or, a blocking determination can be made for all programs. In this case, a program guide can indicate that certain programs are blocked, so the user knows ahead of time that a program is blocked before trying to select the program. If the rating data from the home jurisdiction is available, it is compared to the system rating at block 250 to determine whether to display the program (block 260) or block the program (block 270).

If the rating data from the home jurisdiction is not available at block 220, rating data is obtained for the program for one or more foreign jurisdictions (block 230). When rating data from multiple foreign transmissions is available, the highest (most strict) rating may be applied to the program that the user desires to view (block 240). For example, if one rating is PG and the other is R, then R is used. In another example, if one rating is "ages 10 and above", and the other is "ages 12 and above", then rating "ages 12 and above" is used. In any case, the rating data is tuned, decoded and recovered by the tuner/decoder 100 and provided to the control circuitry 103 for comparison to the system rating to determine if the program can be displayed. Information associated with the selected program, such as packet identifiers (PIDs), is used to retrieve the associated program data from the received transmission. The program data can be stored and/or displayed, for example.

The ratings may be provided according to any rating system. For example, the E-book standard provides an age-based rating system. However, some countries need extra ratings, or use ratings not specified. In order to overcome this, Table 1 translates the rating as transmitted to an age based rating and back. E-book refers to a Digital Terrestrial Television standard that has been adopted in Europe. In this system, ratings are country dependent. As such, if a rating is found for the current country, this rating is used. If such a rating is not found, but a rating is found for one or more other countries, the highest available rating is used to determine whether or not to block a transmission. This translation is explained in Table 1.

In Table 1, the event or program rating is indicated by age along the first row. For example, ages 4 through 18 are provided in columns 1 through 15, respectively. The "universal" rating (U) is in column 17, the "parental approval" (PA) rating is in column 18,and the "X-rated" rating (X) is in column 31. Columns 19 through 30, not shown, are blank and can accommodate additional ratings. The system rating is indicated by the rows of the table. For example, ages 4 through 18 are provided in rows 1 through 15,respectively. The "universal" rating (U) is in row 17, the "parental approval" rating (PA) is in row 18, and the "X-rated" rating (X) is in row 31. Rows 19 through 30, not shown, are blank and can accommodate additional ratings. For each event rating—system rating pair, there is a corresponding cell in the table that indicates whether the program will be blocked (−), or played (√). For instance, if the event rating is age 10, and the system rating is age 11, the program will not be played. Thus, the system rating must be higher than the event rating for the program to be played. Other approaches are possible. For example, the program may be played when the system rating is equal to or higher than the event rating.

As discussed, the event or program rating is the transmitted rating for the home country, if available. Otherwise the highest rating among the foreign transmissions is used. The system rating is the rating as set by the user. For example, the user may decide that programs that require parental approval (PA) or are X-rated should be blocked, or that program that require an age of 12 or higher should be blocked. Other information such as time of day or day of week limitations may also be set.

Table 1 has been completed for all European countries that have their own specification, and can be extended if other countries come up with different ratings.

The table can be augmented to show disabling of the rating by the user, and how to handle non-rated broadcasts. For example, all broadcasts that have rating 0—undefined—will always play, and disabling the rating using the user interface will play all broadcasts irrespective of their rating.

TABLE 1

| System Rating (Age): | | Event Rating (Age): | | | | | | | | | | | | | | | | |
|---|---|---|---|---|---|---|---|---|---|---|---|---|---|---|---|---|---|---|
| | | 4 | 5 | 6 | 7 | 8 | 9 | 10 | 11 | 12 | 13 | 14 | 15 | 16 | 17 | 18 | U | PA | X |
| | | 1 | 2 | 3 | 4 | 5 | 6 | 7 | 8 | 9 | 10 | 11 | 12 | 13 | 14 | 15 | 17 | 18 | 31 |
| 4 | 1 | — | — | — | — | — | — | — | — | — | — | — | — | — | — | — | — | — | — |
| 5 | 2 | √ | — | — | — | — | — | — | — | — | — | — | — | — | — | — | √ | — | — |
| 6 | 3 | √ | √ | — | — | — | — | — | — | — | — | — | — | — | — | — | √ | — | — |
| 7 | 4 | √ | √ | √ | — | — | — | — | — | — | — | — | — | — | — | — | √ | — | — |
| 8 | 5 | √ | √ | √ | √ | — | — | — | — | — | — | — | — | — | — | — | √ | — | — |
| 9 | 6 | √ | √ | √ | √ | √ | — | — | — | — | — | — | — | — | — | — | √ | √ | — |
| 10 | 7 | √ | √ | √ | √ | √ | √ | — | — | — | — | — | — | — | — | — | √ | √ | — |
| 11 | 8 | √ | √ | √ | √ | √ | √ | √ | — | — | — | — | — | — | — | — | √ | √ | — |
| 12 | 9 | √ | √ | √ | √ | √ | √ | √ | √ | — | — | — | — | — | — | — | √ | √ | — |
| 13 | 10 | √ | √ | √ | √ | √ | √ | √ | √ | √ | — | — | — | — | — | — | √ | √ | — |
| 14 | 11 | √ | √ | √ | √ | √ | √ | √ | √ | √ | √ | — | — | — | — | — | √ | √ | — |
| 15 | 12 | √ | √ | √ | √ | √ | √ | √ | √ | √ | √ | √ | — | — | — | — | √ | √ | — |
| 16 | 13 | √ | √ | √ | √ | √ | √ | √ | √ | √ | √ | √ | √ | — | — | — | √ | √ | — |
| 17 | 14 | √ | √ | √ | √ | √ | √ | √ | √ | √ | √ | √ | √ | √ | — | — | √ | √ | — |
| 18 | 15 | √ | √ | √ | √ | √ | √ | √ | √ | √ | √ | √ | √ | √ | √ | — | √ | √ | — |
| (U) | 16 | — | — | — | — | — | — | — | — | — | — | — | — | — | — | — | — | — | — |
| (PA) | 17 | √ | √ | √ | √ | — | — | — | — | — | — | — | — | — | — | — | √ | — | — |
| (X) | 31 | √ | √ | √ | √ | √ | √ | √ | √ | √ | √ | √ | √ | √ | √ | √ | √ | √ | — |

APPENDIX

The following identifies rating information that may be used by the different transmission standards of different countries or regions. The information is subject to change.

Table 2 provides the syntax of the E-book parental rating descriptors. The version of the E-book/EN 300 468 standard used is discussed in EACEM Technical Report, Number TR-030 version 1.1, 7 April 2000, and ETSE EN 300 468 v1.4.1, November 2000, respectively.

The parental rating descriptor is an optional descriptor as defined in EN 300 468 and should conform to appropriate applicable regulations. The receiver should make use of the parental rating signaled through the parental_rating_descriptor to determine the age rating of events containing such information. Conditional Access (CA) systems may also be able to provide parental control through their own private methods. The manufacturer defines the user interface for parental control. It should be configurable and sufficiently safe and should conform to appropriate applicable regulation. From EN 300 468, the parental rating descriptor of Table 2 gives a rating based on age and allows for extensions based on other rating criteria Note that "N" denotes the number of countries or jurisdictions, indicated by "country_code", for which a rating, indicated by "rating', is available.

TABLE 2

E-book Parental rating descriptor

| Syntax | No. of bits | Identifier |
|---|---|---|
| Parental_rating_descriptor( ){ | | |
|     descriptor_tag | 8 | uimsbf |
|     descriptor_length | 8 | uimsbf |
|     for (i=0;i<N;i++){ | | |
|         country_code | 24 | bslbf |
|         rating | 8 | uimsbf |
|     } | | |
| } | | |

The semantics for the parental rating descriptor are as follows.

country_code: This 24-bit field identifies a country using the 3-character code as specified in ISO 3166. Each character is coded into 8-bits according to ISO/IEC 8859-1 and inserted in order into the 24-bit field. If the three characters represent a number in the range 900 to 999, then country_code specifies an ETSI defined group of countries. These allocations are found in ETR 162. For example, the United Kingdom has three-character code "GBR", which is coded as: '0100 0111 0100 0010 0101 0010'.

rating: This 8-bit field is coded according to Table 3, giving the recommended minimum age in years of the end user. For example, a rating of 0x04 implies that end user should be at least 7 years old.

TABLE 3

E-book Parental rating descriptor, rating

| Rating | Description |
|---|---|
| 0x00 | undefined |
| 0x01 to 0x0F | minimum age = rating + 3 years |
| 0x10 to 0xFF | defined b the broadcaster |

Table 4 provides parental rating information for France. The version referenced is Doc. CTE-TNT/GT3-03, revised version of 5th July 2001. The levels "Universal viewing" and "Parental approval preferable" do not correspond to any value defined in the rating field coding of the DVB descriptor. The values 0x10 and 0x11, which are defined by the broadcaster, are thus used to code these two levels.

TABLE 4

France parental rating

| CSA symbols | Correspondence | DVB rating field hexadecimal (decimal) |
|---|---|---|
| Green Circle | Universal viewing | 0x10 (16) |
| Blue Circle | Parental approval preferable | 0x11 (17) |
| Orange Triangle | Prohibited to the under 12 | 0x09 (9) |
| Red Square | Prohibited to the under 16 | 0x0D (13) |
| Purple Cross | Prohibited to the under 18 | 0x0F (15) |

Table 5 provides parental rating information for Spain. The document referenced is: Implementation Guidelines for DTT in Spain, version: v1.0.2. Date: 27 May 2002 (DRAFT). Besides the DVB parental rating defined values, some other user defined values have been defined for parental control in Spain. Table 5 describes these user-defined values. It also defines the values inside the DVB range that should be used. Broadcasters are recommended to avoid using other values than defined in this table, since they will not have a meaning for receivers following this specification.

TABLE 5

Spain parental rating

| Classification | Tag |
|---|---|
| No recomendado para menores de 7 años (not recommended for children under 7 years) | 0x04 |
| No recomendado para menores de 13 años (not recommended for children under 13 years) | 0x0A |
| No recomendado para menores de 18 años (not recommended for children under 18 years) | 0x0F |
| Clasificado X (rated X) | 0x1F |
| Sin clasificar (unclassified) | 0x00 |

Table 6 provides parental guidance codes for Australia. The document referenced is: Digital television—Requirements for receivers Part 1: VHF/UHF DVB-T television broadcasts, first published as AS 4933.1-2000. Draft—Ver 3 27 August 2001. In this case, we use code provided by the Broadcaster in EIT, display Code in EPG (Now & Next), and provide 'Lock-out' with PIN access.

The Australian Parental Guidance classification codes for television programs when transmitted, are intended to be displayed, and form a part of the parental service locking mechanism in a digital receiver. Unlike the DVB European usage, the Australian code is based on program content without age assignment. The transport stream EIT will generally include the DVB parental_rating_descriptor (Tag=0x55) and associated information, but the receiver should use the 'look-up' table given in Table 6 for the on-screen EPG display and the lock-out set-up screen.

The receiver should check the parental_rating_descriptor as indicated in the EIT now/next, when accessing a program, and if the parental guidance lock-out is activated, blank the program if the parental guidance rating is exceeded.

Table 6 provides a recommended on-screen-display for parental guidance codes transmitted within DVB-SI EIT information using the DVB parental_rating_descriptor. The first column indicates the transmitted hex code, and the second column indicates the parental guide code. A receiver menu set-up and suggested on-screen display (OSD) wording for setting blocking (restriction of access) may include: (a) "block all", in which case all programs are blocked until a personal identification number (PIN) is entered, (b) block G and above (optional), in which case all programs rated G and above (e.g., G, PG, M, MA, AV or R) are blocked, (c) block PG and above, in which case all programs rated PG and above (e.g., PG, M, MA, AV or R) are blocked, (d) block M and above, in which case all programs rated M and above (e.g., M, MA, AV or R) are blocked, (e) block MA and above, in which case all programs rated MA and above (e.g., MA, AV or R) are blocked, (f) block AV and above, in which case all programs rated AV and above (e.g., AV or R) are blocked, and (g) block R and above, in which case all programs rated R and above, if applicable, are blocked. The blocking can be removed by entering a personal identification number (PIN).

Notes on Australian Parental Guidance Codes:

(a) The parental guidance set-up in a receiver allows the user to set a maximum parental guidance rating level so that the receiver will only show programs below that level while a PIN number controls access to higher level programs.

(b) An OSD should be used in the parental guidance fields of the receiver's displayed electronic program guide to display the rating, e.g., P, C, G, PG, M, MA, AV or (c) In the case of 0x00 and 0x01 (not classified), a dash should be displayed.

TABLE 6

Australia parental guidance codes

| Hex code | |
|---|---|
| 0x00 | Not classified |
| 0x01 | |
| 0x02 | P Pre school |
| 0x03 | P |
| 0x04 | C Children |
| 0x05 | C |
| 0x06 | G General |
| 0x07 | G |
| 0x08 | PG Parental Guidance Recommended |
| 0x09 | PG |
| 0x0A | M Mature Audience 15+ |
| 0x0B | M |
| 0x0C | MA Mature Adult Audience 15+ |
| 0x0D | MA |
| 0x0E | AV Adult Audience, Strong violence 15+ |
| 0x0F | R Restricted 18+ |

For the UK D-book standard, the relevant document is: Digital Terrestrial Television, Version: 3.01, last updated: 11 February 2001. From the D-book, section 8.5.2.3 Parental Rating Coding, it is stated that parental rating coding is not defined by this document, but is a conditional access (CA) function.

Table 7 indicates a parental rating behaviour as specified in 2.3.5 "Parental control"-MMI-FRS Zapper & ESG v6.2: (AR6-920078KD/C6S 13, status: approved) and 4.22 "Access restrictions—locks—set maturity rating"-MMI-FRS Setup menu v3.2 (AR6-920078KD/C6S18, status approved).

When the E-book behaviour is implemented, the supported values are 0x00-0x0F (age: none, 5-18). Setting this rating is supported through the setup menu. Values 0x10-0xFF are defined by the broadcaster. In Table 7, "-" denotes not in release, "X" denotes in release, and "?" denotes Unknown.

TABLE 7

Parental rating behaviour

| Country: | Missing: |
|---|---|
| France | CSA symbols |
| | 0x10 (universal viewing) |
| | 0x11 (parental approval preferable) |
| Spain | 0x1F Clasificado X (rated X) |
| Portugal | ? |
| Italy | ? |
| Netherlands | ? |
| Australia | 0x01-0x0F Completely other interpretation (normative) |
| UK | — |
| Norway | — |
| Finland | — |
| Sweden | 0x01-0x0F Completely other interpretation (recommended) |

A suggested solution for parental rating is to add 0x10, 0x11, 0x1F to cover France (without the CSA symbols, just text) and Spain, since there is no further overlap at this moment. For Sweden and Australia we need to implement their interpretation, e.g., tables.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but should be construed to cover all modifications that may fall within the scope of the appended claims.

What is claimed is:

1. A method for obtaining rating data, comprising:
receiving a digital data transmission carrying at least one program;
identifying a home jurisdiction of a receiver that receives the digital data transmission;
determining whether rating data is provided in the digital data transmission for the at least one program for the home jurisdiction;
using the rating data for the at least one program for the home jurisdiction, if available, to determine whether to block display of the at least one program; and
if the rating data for the at least one program for the home jurisdiction is not available, using rating data that is provided in the digital data transmission for the at least one program for a foreign jurisdiction to determine whether to block display of the at least one program.

2. The method of claim 1, wherein:
the using the rating data for the at least one program for the home jurisdiction comprises comparing the rating data for the at least one program for the home jurisdiction to a user-defined system rating.

3. The method of claim 1, wherein:
the using the rating data for the at least one program for the foreign jurisdiction comprises comparing the rating data for the at least one program for the foreign jurisdiction to a user-defined system rating.

4. A method for obtaining rating data, comprising:
receiving a digital data transmission carrying at least one program;
identifying a home jurisdiction of a receiver that receives the digital data transmission;
determining whether rating data is provided in the digital data transmission for the at least one program for the home jurisdiction;
using the rating data for the at least one program for the home jurisdiction, if available, to determine whether to block display of the at least one program; and
if the rating data for the at least one program for the home jurisdiction is not available, using rating data that is provided in the digital data transmission for the at least one program for a foreign jurisdiction to determine whether to block display of the at least one program, wherein:
rating data for the at least one program for a plurality of foreign jurisdictions is available in the digital data transmission; and
the using the rating data for the at least one program for the foreign jurisdiction comprises using the highest of the rating data for the at least one program among the plurality of foreign jurisdictions.

5. The method of claim 1, wherein:
the home jurisdiction and the foreign jurisdiction are different countries.

6. The method of claim 1, wherein:
the identifying the home jurisdiction comprises receiving a user setting.

7. The method of claim 1, wherein:
the digital data transmission is provided according to a Digital Video Broadcasting standard.

8. The method of claim 1, wherein:
the digital data transmission comprises at least one of audio and video data.

9. The method of claim 1, wherein:
the digital data transmission is received by at least one of a television and a set-top box.

10. The method of claim 1, wherein:
the digital data transmission is provided in at least one of respective broadcasts, multicasts and streaming content.

11. The method of claim 1, wherein:
the rating data for the at least one program for the home jurisdiction and the foreign jurisdiction comprises an age-based rating.

12. A program storage device tangibly embodying a program of instructions executable by a machine to perform a method for obtaining rating data, the method comprising:
receiving a digital data transmission carrying at least one program;
identifying a home jurisdiction of a receiver that receives the digital data transmission;
determining whether rating data is provided in the digital data transmission for the at least one program for the home jurisdiction;
using the rating data for the at least one program for the home jurisdiction, if available, to determine whether to block display of the at least one program; and
if the rating data for the at least one program for the home jurisdiction is not available, using rating data that is provided in the digital data transmission for the at least one program for a foreign jurisdiction to determine whether to block display of the at least one program.

13. A receiver, comprising:
means for receiving a digital data transmission carrying at least one program;
means for identifying a home jurisdiction;
means for determining whether rating data is provided in the digital data transmission for the at least one program for the home jurisdiction;
means for using the rating data for the at least one program for the home jurisdiction, if available, to determine whether to block display of the at least one program; and
means for using rating data that is provided in the digital data transmission for the at least one program for a foreign jurisdiction to determine whether to block display of the at least one program, if the rating data for the at least one program for the home jurisdiction is not available.

14. A receiver, comprising:
a tuner for receiving a digital data transmission carrying at least one program; and
a control associated with the tuner and configured to: (a) identify a home jurisdiction, (b) determine whether rating data is provided in the digital data transmission for the at least one program for the home jurisdiction, (c) use the rating data for the at least one program for the home jurisdiction, if available, to determine whether to block display of the at least one program, and (d) use rating data that is provided in the digital data transmission for the at least one program for a foreign jurisdiction to determine whether to block display of the at least one program, if the rating data for the at least one program for the home jurisdiction is not available.

15. The method of claim 4, wherein:
the using the rating data for the at least one program for the home jurisdiction comprises comparing the rating data for the at least one program for the home jurisdiction to a user-defined system rating.

16. The method of claim 4, wherein:
the using the rating data for the at least one program for the foreign jurisdiction comprises comparing the rating data for the at least one program for the foreign jurisdiction to a user-defined system rating.

17. The method of claim 4, wherein:
the home jurisdiction and the foreign jurisdiction are different countries.

18. The method of claim 4, wherein:
the identifying the home jurisdiction comprises receiving a user setting.

19. The method of claim 4, wherein:
the digital data transmission is provided according to a Digital Video Broadcasting standard.

20. The method of claim 4, wherein:
the digital data transmission comprises at least one of audio and video data.

\* \* \* \* \*